United States Patent [19]

Mertz

[11] 4,012,070
[45] Mar. 15, 1977

[54] CONVERTIBLE CAMPER VEHICLE
[76] Inventor: Lester L. Mertz, 8529 Comanche Ave., Canoga Park, Calif. 91306
[22] Filed: July 31, 1975
[21] Appl. No.: 600,818
[52] U.S. Cl. .............................. 296/27; 296/23 C; 52/66
[51] Int. Cl.² .......................................... B60P 3/32
[58] Field of Search ............ 296/23 R, 23 C, 23 F, 296/23 G, 23 H, 26, 27; 52/66, 67

[56] References Cited
UNITED STATES PATENTS

| | | | |
|---|---|---|---|
| 2,457,581 | 12/1948 | McCain | 296/26 |
| 3,209,551 | 1/1973 | McCarthy | 296/27 |
| 3,352,596 | 11/1967 | Escoto | 296/27 |
| 3,677,600 | 7/1972 | Charron | 296/27 |
| 3,680,908 | 8/1972 | Bowen | 296/27 |
| 3,850,470 | 11/1974 | Trelle | 296/27 |

Primary Examiner—Philip Goodman
Assistant Examiner—John A. Carroll
Attorney, Agent, or Firm—Roger A. Marrs

[57] ABSTRACT

The camper vehicle disclosed herein provides a self-contained mobile body having a convertible enclosed living compartment defined by laterally extendable berth pods and a raisable top so that in a first roadable configuration, the berth pods and top serve as the opposite sides and top closures and when in a second configuration, the extended berth pods and raised top constitute a pair of berths separated by an interior compartment suitable for standing and moving about. Foldable side covers carried by the top are deployed over the length of each berth panel to enclose the interior compartment areas when in their second configuration. Raising mechanism for the top is employed to support the top and side covers over the berths which include telescoping supports.

6 Claims, 8 Drawing Figures

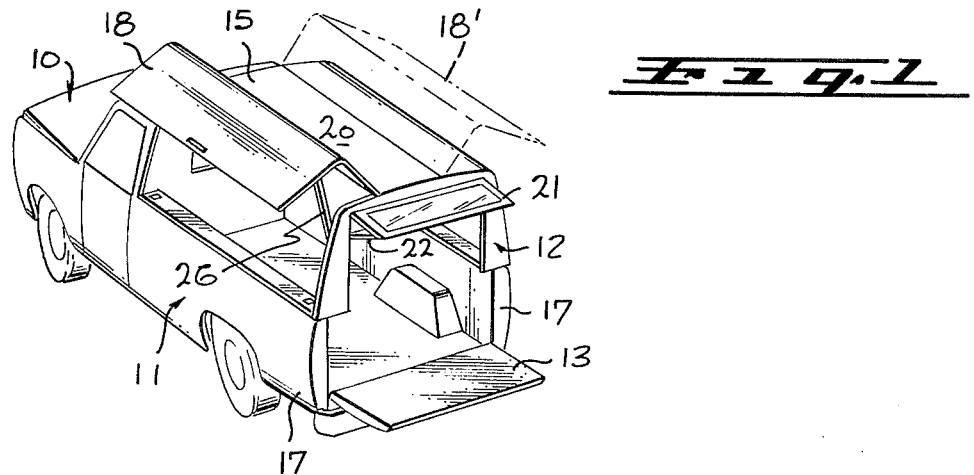
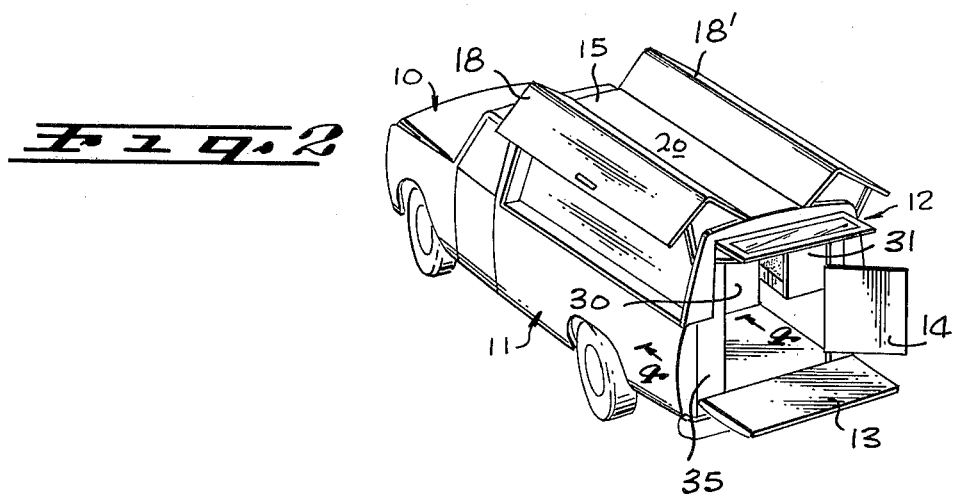
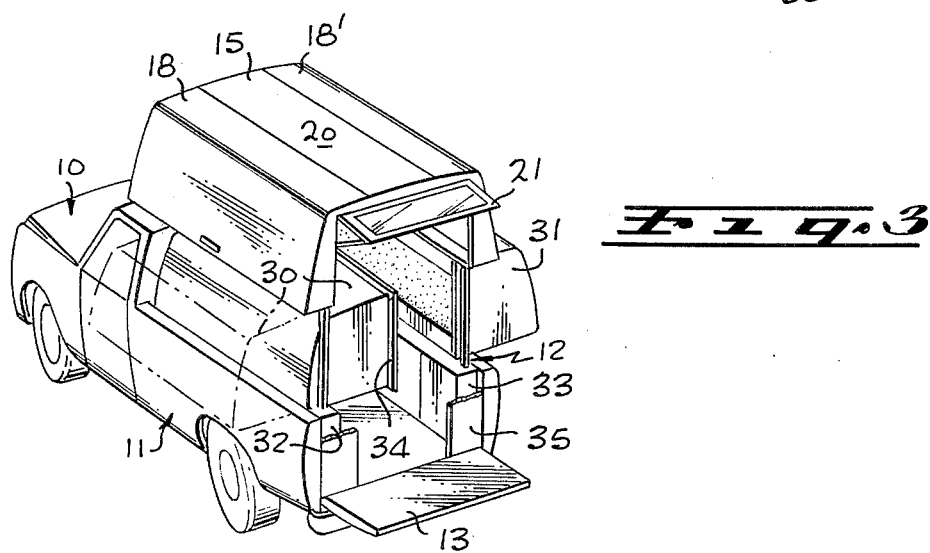

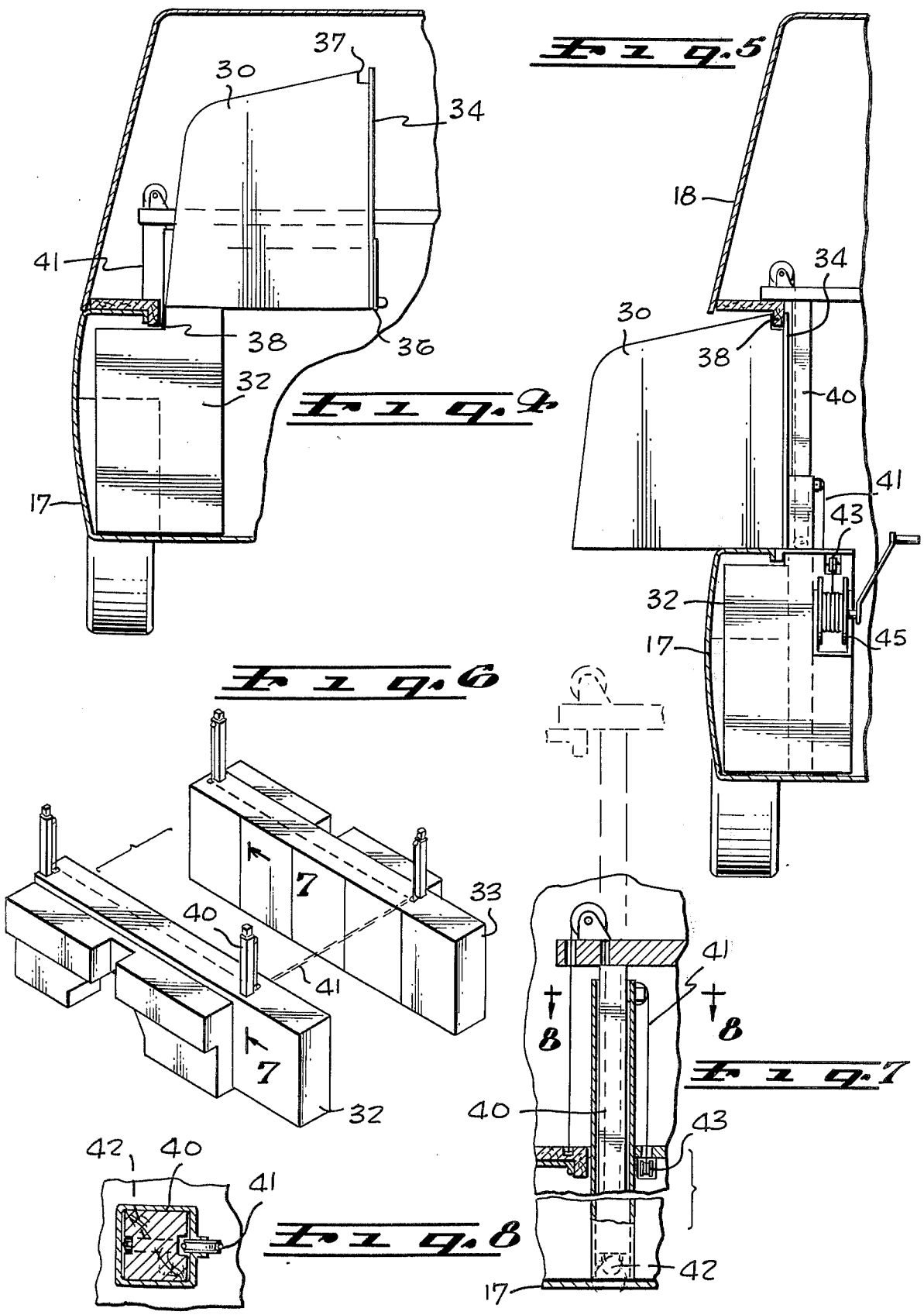

CONVERTIBLE CAMPER VEHICLE

BACKGROUND OF THE INVENTION

1. Field of the Invention

This invention relates to convertible mobile, recreational and living vehicles and, more particularly, to a novel vehicle having extendable berth pods and top defining the living compartment area adapted to provide an interior having an overall width and height greater than when the berth pods and top are in their folded or stowed condition.

2. Description of the Prior Art

A variety of recreational vehicles are currently being employed by campers, hunters, sportsmen, vacationers or the like which combine mobility with living accommodations. A typical vehicle of this class is commonly referred to as a "camper" and utilizes a detachable living enclosure which occupies the open truck bed area of a conventional pick-up truck. Berthing areas extend outwardly over the truck bed sidewalls and an access door is generally provided at the rear of the enclosure. Another version of a camper vehicle or motor home employs a truck frame on which the living enclosure is erected.

However, difficulties have been encountered when employing conventional camper vehicles which largely stem from the fact that the vehicle employs a truck bed or frame which is of a predetermined length and width. The available living enclosure space rearward of the truck cab is relatively limited because of the restricted width and length of the truck frame so that the width of berthing areas are considerably more narrow than normally required to accommodate the full width of a reclining adult. Some attempts have been made to avoid this problem by extending the width of the living compartment or unit beyond the side limits of the truck frame or truck bed so that the entire width of the living enclosure is increased. Although such construction provides more width for berthing areas, the resulting overhang of the enclosure detracts from the off-the-road capabilities of the vehicle. Furthermore, great stresses are placed on the truck frame inasmuch as the conventional frames are loaded to an extent not compatible with their original design intent.

Other attempts have been made to provide living enclosures or units with full-width berthing areas that include an extendable side portion of the compartment which telescopes with respect to the main portion so that during travel, the overhang can be eliminated as the vehicle moves and when at rest, the side portion can be extended to increase the berthing space. Obviously, such extendable compartment portions are relatively complex, expensive and require periodic maintenance. Those conventional vehicles which employ a fixed living compartment or unit thereon, have limited utility in that the vehicles are generally restricted solely to the use thereof as a camper. Also, no means are provided for raising the top or roof of the compartment or enclosure so as to provide for standing room.

SUMMARY OF THE INVENTION

Accordingly, the convertible camper vehicle of the present invention obviates the aforementioned problems and difficulties by providing a camper vehicle having a living enclosure having width bunks or berths and a raisable top and still maintains the basic dimensional (envelope) characteristics of the carrier vehicle. The living compartment includes lateral, extendable berth pods which may be selectively extended outwardly to provide increased living space therebetween wherein an extendable or raisable top may be employed to achieve full-height or standing space.

In one form of the invention, the camper vehicle provides a vehicle body defining a living compartment having outwardly extendable lateral side pods adapted to form a pair of berths when extended. Each berth pod slidably mounts on a supporting frame carried on the bed of the vehicle. Cover means having pivotal side panels are employed to enclose each of the berthing pods while the vehicle is in its roadable condition and actuating means are employed to support the cover over the living compartment when the vehicle is in its parked condition. Means are employed to interconnect the support means with the frame and the berth pods so as to stabilize the berthing areas when the side panels are pivoted and pods are fully extended. Telescoping members are carried on the frame which serves to support the top cover when raised so that the height of the compartment is substantially increased.

Therefore, it is among the primary objects of the present invention to provide a lightweight mobile camper body or compartment capable of providing full-width sleeping accommodations with the advantage of little or no side overhang of the vehicle frame while the vehicle is in its roadable condition.

Another object of the present invention is to provide a novel mobile camper vehicle having a living enclosure defined by extendable side panels which, when extended, serve as full-length access areas leading into the interior of the compartment.

Another object of the present invention is to provide a novel mobile camper having a living compartment of relatively short height and width so that the overall vehicle dimensional envelope is substantially unaltered during its roadable configuration while incorporating laterally extending berth pods adapted to serve as berthing areas in one position. A compartment top having side closures serves to provide access to the interior and includes means for raising and lowering the top.

Yet another object of the present invention is to provide a convertible mobile camper having a first configuration substantially similar to a conventional panel-body truck and a second configuration wherein the sides of the compartment and the top of the compartment may be extended as a unitary structure to provide a full adult length, width and standing space.

A further object resides in the provision of a novel vehicle having pivoting side panels for access to the interior for storage of tools and supplys and adapted to receive berths, stove, basins, etc. so as to provide living quarters in another configuration.

Another object of the invention resides in a vehicle having an enclosure carried on the bed thereof suitable for usage as a store room for tools and the like or suitable for insertably receiving fixed units such as berths, basing and the like for use as an overnight camper.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a rear perspective view of the novel convertible camper vehicle of the present invention illustrating the side portions thereof raised for side access to the interior;

FIG. 2 is a view similar to the view shown in FIG. 1 illustrating the camper living compartment occupied by parallel berths preparatory to lateral deployment;

FIG. 3 is a perspective view of the camper vehicle showing the top of the compartment raised and the berths laterally deplayed;

FIG. 4 is an enlarged transverse cross sectional view of the camper vehicle having the berths in their stowed position;

FIG. 5 is a view similar to the view of FIG. 4 showing the berths moved laterally and the top raised as illustrated in FIG. 3;

FIG. 6 is a perspective view of the berth and top supports defining the living enclosure of the camper vehicle;

FIG. 7 is an enlarged sectional view of the mechanism for raising the compartment top as taken in the direction of arrows 7—7 of FIG. 6; and FIG. 8 is a transverse cross sectional view of the telescoping posts supporting the top of the compartment shown in FIG. 7 as taken in the direction of arrows 8—8 thereof.

DESCRIPTION OF THE PREFERRED EMBODIMENT

Referring to FIG. 1, a light-weight all-wheel drive vehicle is indicated by numeral 10 which includes a rear body portion 11 adapted to mount a living compartment 12. The body 11 may include a rear tailgate 13 or may include an access door or panel 14. The living compartment 12 includes a forward portion 15 which is disposed adjacent the cab or driver's compartment of the vehicle and a rear portion 16 which fits into the open truck bed area of the vehicle defined by opposite side walls 17. As can be seen in the configuration of FIG. 1, the living compartment does not overhang the sidewalls 17 or the rear tailgate 13 so that the original vehicle envelope is not changed. Furthermore, the length and width of the vehicle truck bed is conventional and is substantially narrower than is required to accommodate two single reclining adults lying between the sides 17 of the vehicle bed 11.

Each side of the living compartment 12 is defined by side panels 18 and 18' pivotally connected to the upper edge marginal regions of a central top panel 20. The panels 18 serve as sides for the compartment and enclose the interior thereof when the vehicle is in its roadable or travelling condition. Suitable latch means may be provided to releasably secure the side panels to the compartment so that the panels will be retained in the closed position. Furthermore, the rear of the compartment 12 is enclosed by a pair of rear panels 21 and 22 representing half-doors which are pivotally connected to the respective rear ends of the compartment by means of hinges. Latch devices are included on each of the rear panels 21 and 22 so that the half-doors may be secured when desired to complete the enclosure of compartment 12. As indicated in FIG. 1, the side panels 18 and 18' may be pivoted outwardly and upwardly so as to provide access into the interior of the compartment. When so extended, a brace or latching means 26 may be employed to support the side panel.

Referring now to FIG. 2, the side panels 18 and 18' have been deployed so as to extend upwardly and outwardly from the sides of compartment 12 exposing the interior thereof. To stabilize the extended side panels, a leg brace 26 pivotally attached to the underside of the side panel is positioned to support the panel in its open condition. It can clearly be seen that each of the panels 18 and 18' are composed of a pair of portions that are arranged substantially at 90° to each other so that one portion is coextensive with the top 15 and the other portion is coextensive with the sides of the vehicle when the panels are in their closed positions. A feature of this construction resides in the fact that when the panels are opened as shown in FIG. 2, ready access is available through the openings in the side of the compartment so that the user may have access to stored articles without having to remove other articles such as when access is solely from the rear of the vehicle. Furthermore, when the panels are so raised, the side portion of the panel provides a side overhang to protect the user and the side opening from rain or other inclimate weather.

FIG. 2 further illustrates the provisions for storing within the living compartment 12, a pair of berth pods indicated in general by numerals 30 and 31. When the vehicle is in its roadable condition, these pods are positioned as shown and are not generally available for use. However, when the vehicle has been parked and it is desired to use the interior for living purposes, the side panels 18 and 18' are lifted or raised and the elongated berth pods 30 and 31 may be laterally extended or slid outwardly through the side openings in the compartment as shown in FIG. 3. Also, as indicated in FIG. 3 the top of the compartment is raised and perferably, the berth pods are not slid out until the top has been fully extended upwardly as shown. In this condition, the panels 18 and 18' need not be pivoted about the top central panel 15.

As shown in FIG. 3, berth pod 31 is fully extended laterally from the compartment and berth pod 30 is still within the compartment preparatory to lateral extension as shown in broken lines. Once the top of the compartment has been fully raised, complete stand up room is available and once the pods 30 and 31 have been laterally extended, substantial living space is available within the enclosure. It is to be understood that when the pods are extended and the top has been raised, the living space is fully enclosed since the adjacent edges of the panels 18 and 18' with the tops of the pods 30 and 31 are fully sealed. Also, a front panel (not shown) for the top is provided for additional enclosure of the living space.

It is to be understood that when the pods 30 and 31 are in their stowed condition, they are resting on parallel frame members 32 and 33 positioned adjacent the inside wall surface of the vehicle open bed sides 17 and that these frame members are in fixed based relationship with respect to each other so as to support the pods 30 and 31 and, to be described later, to support the top and its raising mechanism.

In further reference to FIG. 3, it can be seen that each of the berth pods, such as pods 30 for example, includes a peripheral flange 34 that extends about the opening of the pod. This flange engages with the underside of the top and with the supporting means thereof for effecting proper sealing. It is to be noted that the rear of the truck bed is provided with upright support 35 against which the flange 34 will seal at the rear of the compartment. For clarification, these rear panels have been broken away in FIG. 3 to expose the support frame members 32 and 33.

In FIG. 4, which is a sectional view taken in the direction of arrow 4—4 in FIG. 2, the pod 30 is shown in its stowed position supporting on member 32 and a convenient pin or rod 36 carried on the front of the compartment. In FIG. 5, the top of the compartment has been raised and compartment or pod 30 has been moved outwardly thereunder to a position where it rests on the top of the truck bed integral with side 17. A notch 37 is provided adjacent the flange 34 so that a downwardly depending flange 38 may be positioned within the groove 37 to seal and retain the pod 30 in position. This same downwardly depending flange 38 is also used, as shown in FIG. 4, for securing the pod 30 in its position supported on frame 32 by interposing between the top of the truck bed side 17 and the compartment.

As shown more clearly in FIG. 5, a mechanism is provided for raising and lowering the compartment top which includes a telescoping member 40 at each corner thereof which is supported on the frame members 32 and 33. In FIG. 6, the four supporting telescoping members are illustrated as well as their interconnection via a cable 41 which operatively moves one portion of the telescoping member with respect to the other for raising and lowering of the top. This latter mechanism is illustrated in FIG. 7 and may comprise a plurality of pulleys, such as pulleys 42 and 43 about which the cable 41 is suitable trained. It is to be understood that other mechanisms may be employed if desired. In FIG. 8, a transverse cross-sectional view of the telescoping members are shown wherein one portion thereof is slidably disposed within the other.

Therefore, it can be seen that the novel invention of the present embodiment illustrates and discloses a suitable camper vehicle or accessory vehicle for carrying a plurality of items through which access may be gained by lateral extension of panels 18. The living compartment may include berth pods which are laterally extended so as to increase the size of the vehicle when it is not in its moving condition. Both the top and the sides open up and suitable mechanism is shown for achieving and translating these movements.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A self contained mobile vehicle comprising:
    a body having a convertible enclosed living compartment;
    a pair of berth pods defining the opposite sides of said compartment and laterally extendable on said vehicle body;
    means cooperatively carried on each of said berth pods and said vehicle body for sliding said pods laterally so as to extend said pods outwardly from the opposite sides of said vehicle body;
    a raisable top carried on said body having a first roadable position enclosing said berth pods with downwardly depending side panels constituting opposite vehicle body sides and top closures and a second position raised above said body to permit lateral extension of said berth pods defining an interior compartment suitable for standing and moving about therein; and
    said side panels are foldable side covers pivotally carried along opposite side marginal regions of said top and deployable over the length of each of said berth pods to complete enclosure of said interior compartment when said top is in its second position; and
    means carried on said body operably connected to said top for raising and lowering said top in either of said first and second positions.

2. The invention as defined in claim 1 wherein each of said berth pods includes opposite end panels connected together by a bottom, a side wall and a top whereby said pod constitutes a lateral extension of said compartment to fully enclose said interior compartment.

3. The invention as defined in claim 2 wherein said raising and lowering means includes telescoping supports extendably supporting said top on said body.

4. The invention as defined in claim 3 including expandable supports pivotally coupled between said body and said top allowing access into said interior compartment about said pods.

5. The invention as defined in claim 4 wherein said top includes a pair of pivoted L-shaped panels enclosing said berth pods when in said top first roadable position.

6. The invention as defined in claim 5 wherein said body further includes a rear closure door and window.

* * * * *